Figure 1:
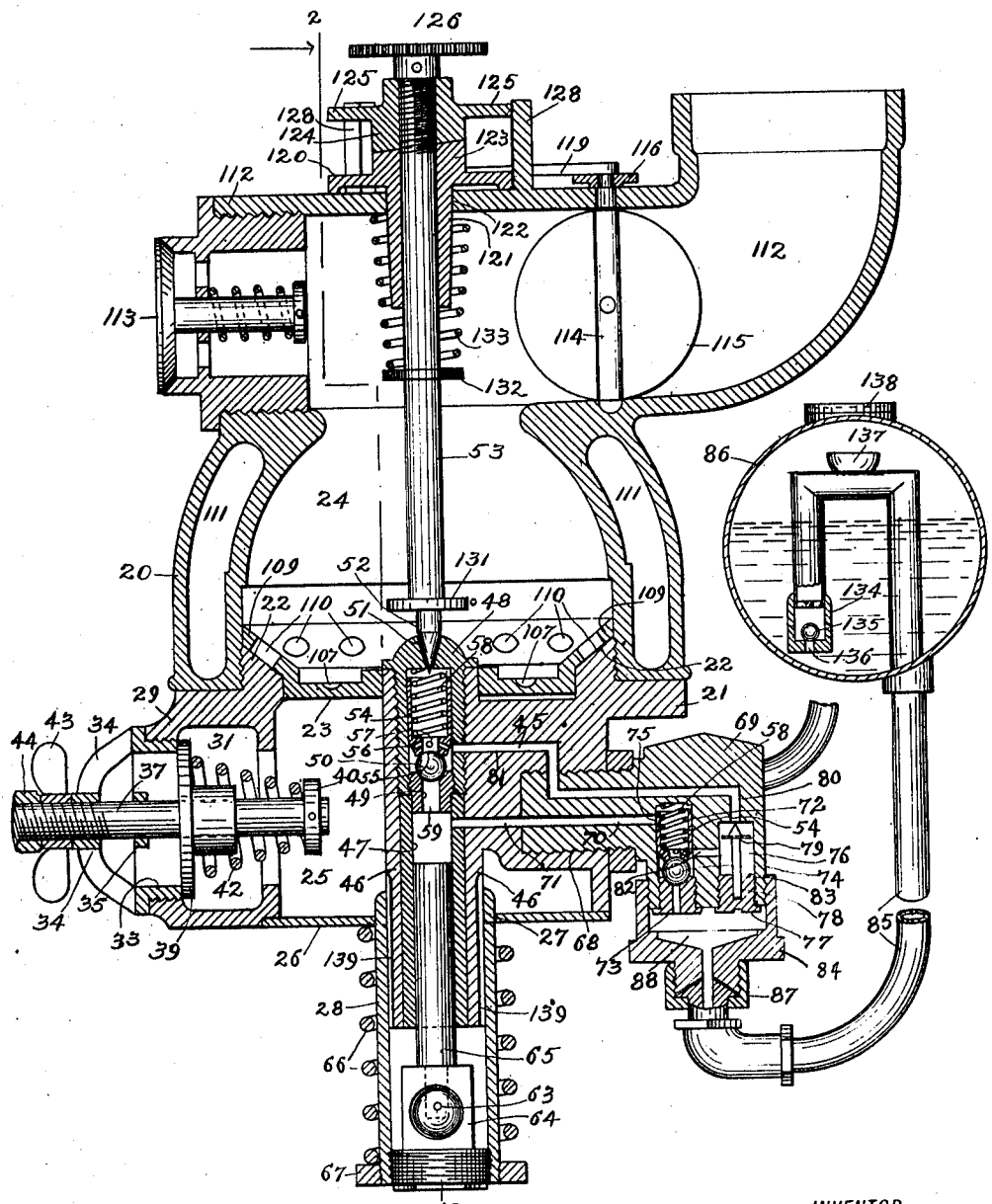

B. IVOR.
FORCE FEED CARBURETER.
APPLICATION FILED JULY 25, 1910.

1,004,031.

Patented Sept. 26, 1911.
5 SHEETS—SHEET 1.

WITNESSES:
Chas. E. Gorton
J. E. Hansen.

INVENTOR
Barry Ivor.
BY
ATTORNEY

B. IVOR.
FORCE FEED CARBURETER.
APPLICATION FILED JULY 25, 1910.

1,004,031.

Patented Sept. 26, 1911.
5 SHEETS—SHEET 2.

WITNESSES:

INVENTOR
Barry Ivor.

B. IVOR.
FORCE FEED CARBURETER.
APPLICATION FILED JULY 25, 1910.

1,004,031.

Patented Sept. 26, 1911.
5 SHEETS—SHEET 3.

WITNESSES:

INVENTOR
Barry Ivor.
BY
ATTORNEY

B. IVOR.
FORCE FEED CARBURETER.
APPLICATION FILED JULY 25, 1910.

1,004,031.

Patented Sept. 26, 1911.

5 SHEETS—SHEET 4.

WITNESSES:
Chas E Gorton
J E Hansen

INVENTOR
Barry Ivor.
BY
Chas C. Hillman
ATTORNEY

B. IVOR.
FORCE FEED CARBURETER.
APPLICATION FILED JULY 25, 1910.

1,004,031.

Patented Sept. 26, 1911.

5 SHEETS—SHEET 5.

WITNESSES:
Chas E. Gorton
J E Hansen

INVENTOR
Barry Ivor.
BY Chas C. Gillman
ATTORNEY

UNITED STATES PATENT OFFICE.

BARRY IVOR, OF CHICAGO, ILLINOIS.

FORCE-FEED CARBURETER.

1,004,031.　　　　Specification of Letters Patent.　　Patented Sept. 26, 1911.

Application filed July 25, 1910. Serial No. 573,745.

*To all whom it may concern:*

Be it known that I, BARRY IVOR, a citizen of the United States, residing at Chicago, in the county of Cook and State of Illinois, have invented certain Improvements in Force-Feed Carbureters, of which the following is a specification.

This invention relates to certain improvements in a device somewhat similar in its nature and construction to those set forth in my co-pending applications for Letters-Patents for improvements in carbureters, filed January 13, 1910, Serial Number 537,872, and February 25, 1910, Serial Number 545,868, and some of the objects of the present invention are like those disclosed in the above-named applications, but other objects, advantages and results will be attained thereby, and the same, in part, are as follows; to provide a compact, simple, inexpensive and efficient carbureter for explosion or hydrocarbon engines of various types for various purposes, but more particularly for gasolene engines for operating automobiles; to dispense with the ordinary float-chamber and float-valve therefor, in which chamber the liquid fuel is usually maintained approximately at a constant level by said valve, the use of which chambers and valves is objectionable for the reason said valves are liable to clog, to be misplaced by the vibrations of the machine and to permit flooding or undercharging of the engine, besides the float-chamber occupies considerable space; to provide a carbureter having means to adjust and maintain during its operation the proper proportions of air and hydrocarbon admitted thereto, also to introduce the air to the carbureter so as to produce a more thorough and complete mixture than is ordinarily done; to provide automatic means for the admission of air, to the carbureter, in proper proportions, under different speeds of the engine; to furnish means for withdrawing any surplusage of gasolene or hydrocarbon which may collect in the mixing chamber and for forcing it back into a reservoir or channels leading therefrom.

Other objects and advantages of the invention will be disclosed in the subjoined description and explanation.

Figure 2:
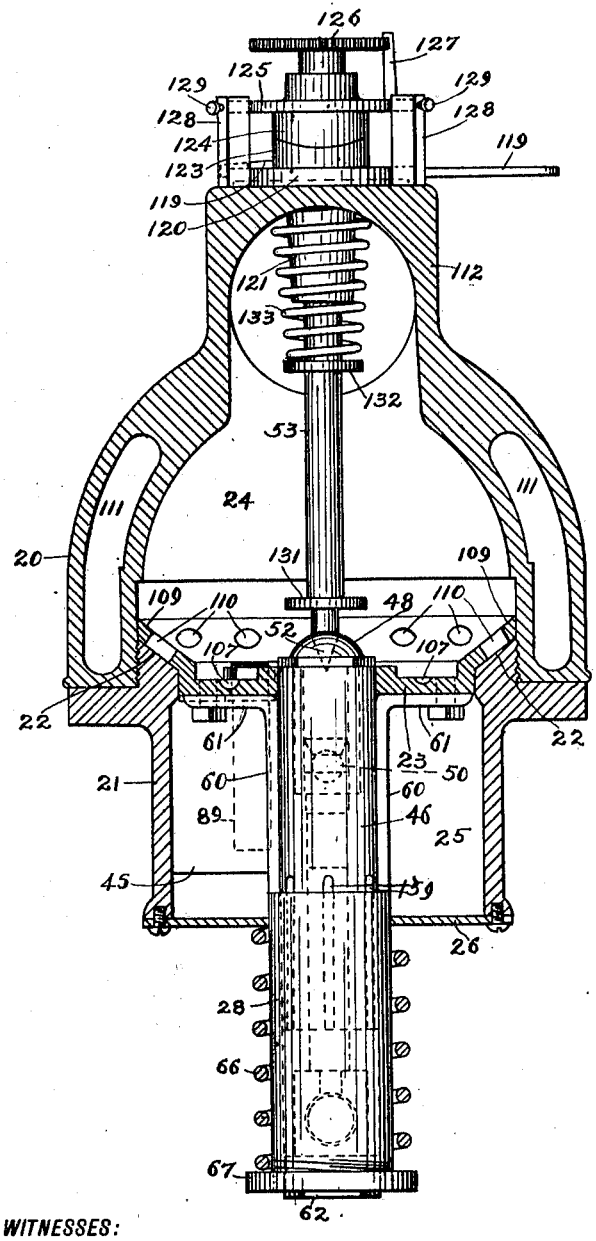
Figure 3:
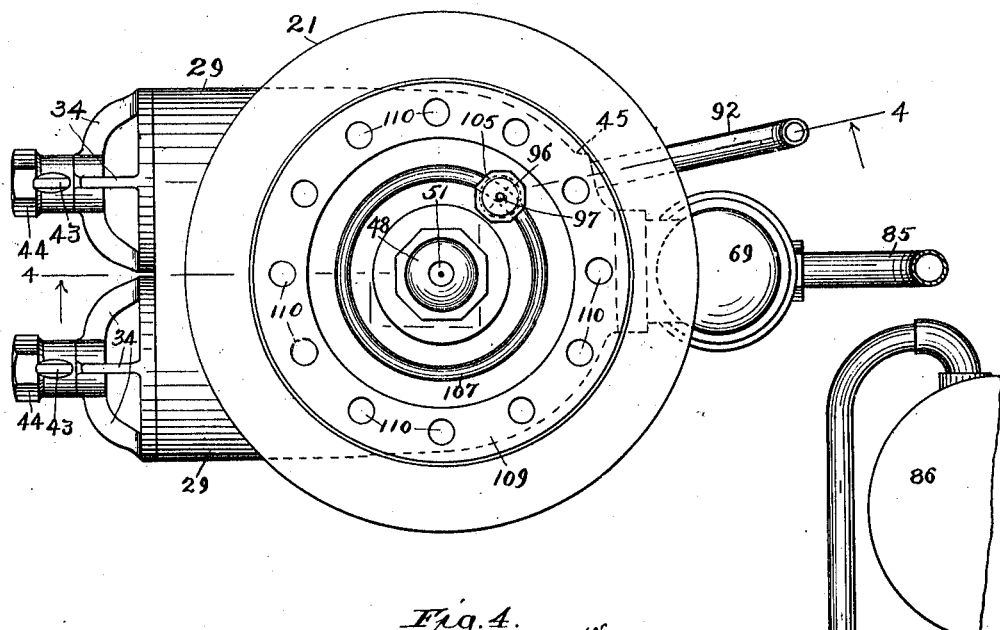
Figure 4:
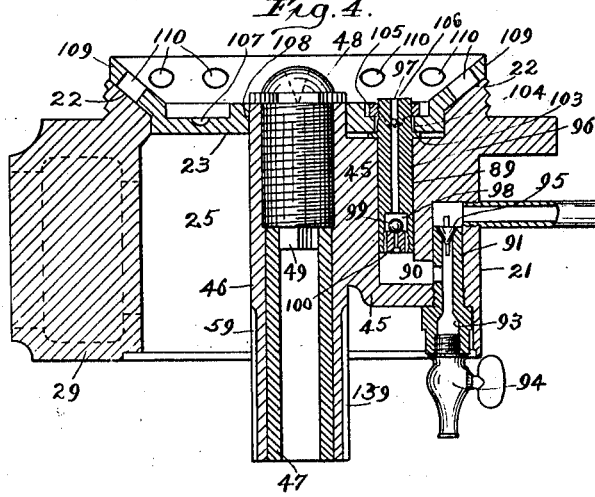
Figure 5:
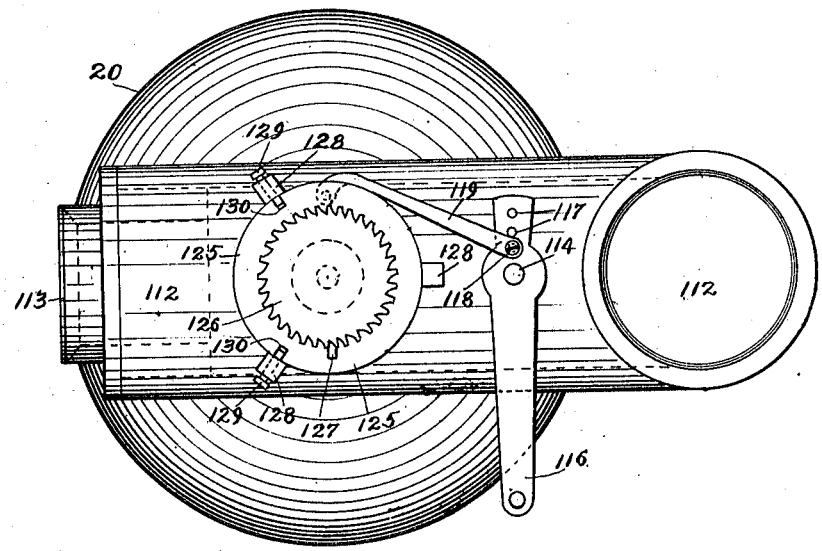
Figure 6:
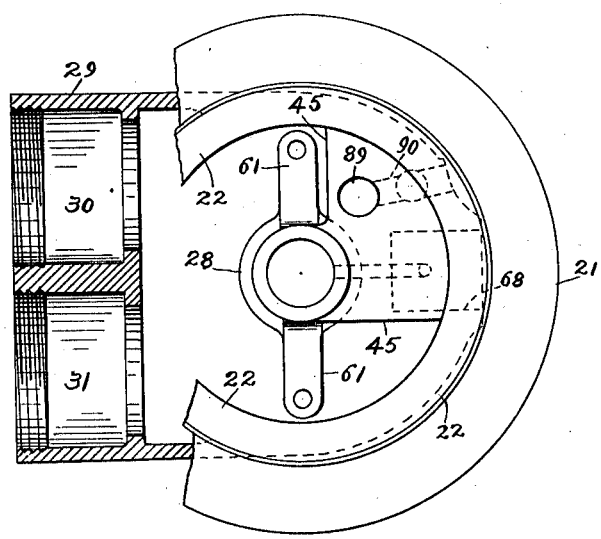
Figure 7:
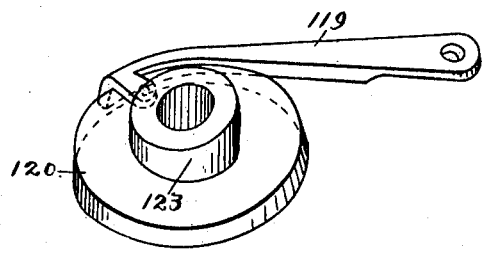
Figure 8:
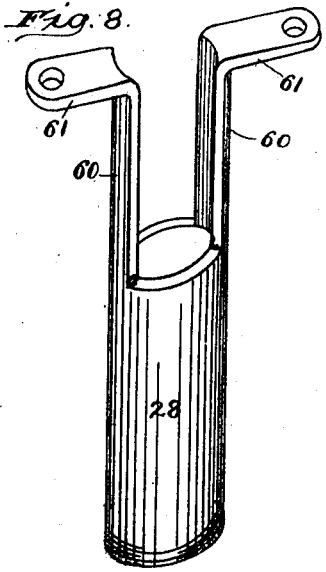
Figure 9:
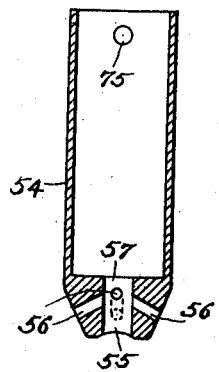
Figure 10:
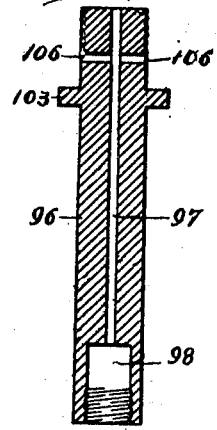
Figure 12:
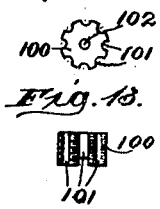
Figure 13:
Figure 11:
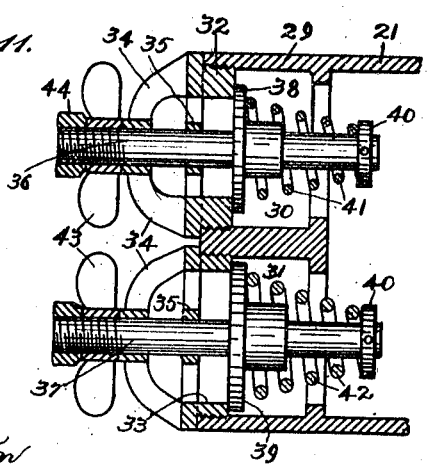

In the accompanying drawings which illustrate an embodiment of the invention—Figure 1, is a vertical central sectional view of a carbureter embodying the invention; Fig. 2, is a vertical view partly in section and partly in elevation taken on line 2—2 of Fig. 1, looking in the direction indicated by the arrows; Fig. 3, is a plan view of the lower portion of the casing with the upper portion or mixing chamber thereof removed and illustrating the construction of the valve for the mixing chamber; Fig. 4, is a developed vertical sectional view taken on line 4—4 of Fig. 3, looking in the direction indicated by the arrows; Fig. 5, is a plan view of the device showing the means for regulating the discharge of gasolene or hydrocarbon to the mixing chamber; Fig. 6, is a plan view partly in section and partly in elevation of a part of the lower portion of the casing with the valve for the mixing chamber removed as well as the valves for the inlet or air removed; Fig. 7, is a perspective view of one of the disks used for regulating the needle valve; Fig. 8, is a similar view of the arm-carrying-sleeve which connects the pump plunger to the valve of the mixing chamber; Fig. 9, is a vertical sectional view of one of the tubular guards for the ball-valves which control certain of the ports of the pump of the carbureter; Fig. 10, is a similar view of a plunger carried by the valve of the mixing chamber for withdrawing surplus fluid from said chamber; Fig. 11, is a horizontal sectional view of a part of the lower portion of the casing showing the valves for controlling the inlet of air; Fig. 12, is an end view of the plug employed for holding the ball-valve in the cavity of the lower portion of the plunger shown in Fig. 10; and Fig. 13, is a side view of said plug.

Like numerals of reference, refer to corresponding parts throughout the different views of the drawings.

The casing of the carbureter is shown as consisting of upper and lower parts 20, and 21, respectively, which are hollow and a part of each, circular in shape. The lower portion of the part 20, and the upper portion of the part 21, are adapted for screw-engagement with one another, and the upper portion of the part 21, is provided with a valve seat 22, which is preferably inwardly and downwardly inclined as shown in Figs. 1, and 2, of the drawings for co-action with the valve 23, of the mixing chamber 24, with which the upper portion 20, of the casing is provided. The lower end of the cavity 25, or air-chamber in the portion 21, of the casing, is closed by means of a plate 26, which is fastened to the casing and has a central opening 27, for the reception of a portion of the pump body and reception and operation of a part of a reciprocating sleeve 28, which surrounds the lower portion of the pump body and is connected to the pump plunger as will be presently explained.

The part 21, is provided on its wall with an extension 29, having two valve chambers 30, and 31, which communicate with the air-chamber 25, and have their outer ends screw threaded to receive valve seats 32, and 33, respectively each of which seats is annular in shape and provided with cross-pieces 34, and 35, through suitable openings in which are extended valve stems 36, and 37, which carry valves 38, and 39, to co-act with the valve seats 32, and 33, respectively. Each of said valve stems has at its inner end a collar or projection 40, against which the inner end of springs 41, and 42, which surround the stems 36, and 37, respectively rest, the other ends of which springs rest against the valves 38, and 39, respectively, which valves are loosely mounted on their respective stems. The outer end of each of said stems is screw-threaded to receive nuts 43, and 44, employed for adjusting the tension of said springs. The portion 21, of the casing is provided with an inward extension 45, opposite a portion of the extension 29, and said inward extension 45, is provided at its inner portion with a vertical extension 46, forming the pump cylinder or body, which body is located centrally within the part 21, and is provided with a vertical bore or opening, the upper portion of which is internally screw-threaded. The lower portion of the bore or opening of the pump body is preferably provided with metallic bushing 47, and the upper portion of said bore has screwed thereinto a hollow plug 48, the lower portion of which is internally screw-threaded to engage a valve seat 49, for a ball valve 50, located in the cavity of the plug 48, the upper end of which is provided with a downwardly tapered valve seat 51, for a needle or tapered valve 52, on the lower end of a stem 53, the upper portion of which projects through the top of the part 20, of the casing and is screw-threaded.

Movably located in the cavity of the plug 48, is a tubular guard 54, which has its lower portion slightly tapered and its lower end formed with a seat 55, for the ball valve 50, see Figs. 1, and 9, of the drawings. The guard 54, also has in its lower portion a series of ducts 56, and a vertical channel 57, with which they communicate at their inner ends. Located within the guard 54, is a coiled spring 58, the lower end of which rests against the lower portion of said guard and the upper end against the upper portion of the plug 48, so as to normally press the guard 54, downwardly against the ball valve 50, which controls the supply of liquid hydrocarbon from the pump through the opening 59, in the valve seat 49, to the mixing chamber. The lower portion of the pump body 46, projects through the opening 27, in the plate 26, of the casing and is provided on its outer surface with a series of vertical grooves 59, extending at their upper ends into the air chamber.

Movably mounted on the lower portion of the pump body 46, is a sleeve 28, which has its lower end both externally and internally screw-threaded and projects at its upper end a slight distance through the opening 27, into the air chamber. The upper portion of the sleeve 28, see Fig. 2, has diametrically disposed and upwardly extended arms 60, the upper portion of each of which is provided with a lateral extension 61, which are secured to the lower surface of the valve 23, of the mixing chamber. Screwed into the lower end of the sleeve 28, is a plug 62, which has a ball and socket connection 63, on an upward projection 64, on said nut with the lower end of the pump plunger 65, which is located within the metallic bushing 47, of the pump body.

Surrounding the sleeve 28, and resting at one of its ends against the plate 26, of the casing is a spring 66, the lower end of which rests against a nut 67, screwed on the lower portion of the sleeve 28, which nut is employed to regulate the tension of said spring. By means of the above described construction and arrangement of the pump body and its connections with the sleeve 28, it is evident that the plunger 65, may be suitably adjusted by means of the screw plug 62, and that as the plunger and said plug are connected together by means of the ball and socket joint 63, the plunger will always be maintained in perfect alinement with the cavity of the pump body and it is further evident that the grooves 139, in said body will afford means for the escape into the air chamber of any liquid hydrocarbon which may leak from the pump into the sleeve 28, in the operation of the device. The grooves 139 will also prevent an air cushion being formed between the lower end of the pump body and the plug 62, in said sleeve. The inward extension 45, of the part 21, of the casing is provided with an opening 68, into which is fitted a plug 69, which is provided with a channel 70, communicating at one of its ends with a channel 71, extending from the inner portion of the opening 68, through a part of the extension 45, and metallic bushing 47, and communicating with the pump chamber. The other end of the channel 70, communicates with a vertically disposed opening 72, in the lower portion of the plug 69, which latter opening is provided in its lower part with a valve seat 73, for a ball valve 74, in the chamber 72, in which chamber a tubular guard 54, of the construction shown in Fig. 9, and above described is located for slight vertical movement. The lower portion of this guard is held in contact with the valve 74, by means of a spring 58, resting at one of its ends against the top of the chamber 72, and at its other end against the lower portion of said guard. The guard 54, used in the chamber 72, is preferably provided near its upper end with an opening 75, to register with the channel 70, but said opening is not essential in the guard 54, which is used in the cavity of the screw plug 48, in the upper part of the pump body, otherwise these tubular guards are similar in construction and perform like functions. The outer portion of the plug 69, is provided with a vertically disposed valve chamber 76, in the lower end of which is located a plug 77, which has in its inner portion an opening 78, to receive the lower end of the stem of a float valve 79, located in the chamber 76, which valve when raised sufficiently by the accumulation of liquid in the chamber 76, will close the lower end of a channel 80, formed in the plug 69, which channel communicates at its other end with a channel 81, leading from the opening 68, through the extension 45, into the cavity of the plug 48, just above the ball valve 50, therein.

By reference to Fig. 1, it will be seen that the chambers 72, and 76, have communication with one another through a port 82, formed in the plug 69, and that said chambers extend upwardly through the lower end of a downward extension 83, on the plug 69, which extension is externally screw-threaded and has secured thereon a fitting 84, to the lower portion of which a pipe 85, leading to and within a reservoir or tank 86, for liquid hydrocarbon, which reservoir may be suitably located and supported, is connected by means of a coupling 87, of a suitable kind. Thus it will be seen that the cavity 88, of the fitting 84, will have communication with a supply of hydrocarbon from which cavity the same will be supplied to the pump, and from and by means of the latter forced into the mixing chamber.

Referring now to Figs. 3, 4, 6, and 10, of the drawings, it will be seen that the inward extension 45, of the part 21, of the casing is provided with a vertical opening 89, which extends from the upper surface of said extension to near its lower surface and communicates through a channel 90, with a vertically disposed opening or chamber 91, which extends upwardly from and in the lower portion of said extension and has communication at its upper end with one end of an outlet pipe 92, the other end of which may communicate with the upper portion of the reservoir 86. Located in the chamber 91, is an apertured valve casing 93, which is provided at its lower end with a drain cock 94, and has seated in its upper end a float valve 95, to prevent the return flow of liquid through the pipe 92. Movably located in the opening 89, is a plunger 96, which is provided with a longitudinally extended bore or discharge orifice 97, which communicates at its lower end with a chamber 98, for a ball valve 99, which rests on a valve seat 100, fitted in the lower portion of said chamber. This valve seat is provided in its periphery with a series of grooves 101, and with a central opening 102, for the passage of liquid.

The upper portion of the plunger 96, is provided with a lateral projection 103, which rests against the lower surface of the valve 23, of the mixing chamber through a suitable opening 104, in which, the upper part of the plunger 96, is extended and which may be secured in such position by means of a nut 105, engaging the upper end of the plunger, which is also provided with laterally disposed channels 106, which communicate at one of their ends with the bore or orifice 97, and at their other ends with an annular groove 107, formed in the upper surface of the valve 23, around the central opening 108, in said valve through which the upper portion of the pump body is extended. The groove 107, in the valve 23, is deepened toward the opening 104, in said valve so as to conduct any surplus liquid which may collect on the valve 23, to the channels 106, and bore 97, in said plunger. For the purpose of guiding any excess liquid hydrocarbon from the mixing chamber into the groove 107, of the valve therefor, as well as for the purpose of directing currents of air admitted to the mixing chamber through said valve, the same is provided at its periphery with an inwardly and downwardly inclined flange 109, having a series of upwardly and inwardly directed openings 110, for the passage of air which flange is adapted to rest on the inclined seat 22, when the valve is closed.

The upper part 20, of the casing is preferably formed with a circumferential channel 111, or water jacket for the circulation of water used to increase the temperature of the mixing chamber which it surrounds and said part is provided at its upper end with a hollow extension or conduit 112, which communicates with the mixing chamber and may have one of its ends suitably connected to the engine, not shown. The other end of the extension 112, is provided with a back-fire-valve 113, of the ordinary construction. Journaled in the extension 112, is a shaft 114, on which is mounted a damper 115, to regulate the passage of the mixture from the mixing chamber to the engine. Secured near one of its ends to the shaft 114, above the extension 112, is a lever 116, which may be suitably connected at one of its ends to a lever (not shown) on the machine, used for regulating the supply of carbureted air to the engine. Near its other end the lever 116, is provided with a series of openings 117, to receive a pivot 118, used for pivotally connecting one end of a link 119, to said lever the other end of which link is pivotally connected to a rotary disk 120, used for regulating the supply of hydrocarbon from the pump to the mixing chamber. The disk 120, is provided with a hub 121, extended through an opening 122, in the upper portion of the extension 112, and with a cam-faced upward extension 123, to co-act with a cam-faced downward extension 124, on a disk 125, which is adjustably mounted on the upper portion of the needle valve stem 53, which stem carries on its upper end a ratchet wheel 126, adapted for engagement with a spring pawl 127, extended upwardly from the disk 125, so as to prevent the turning of the valve stem 53, except when desired.

Extended upwardly from the extension 112, are a number of uprights 128, two of which are herein shown as being provided near their upper ends with transversely disposed screws or projections 129, which are adapted to fit in recesses 130, formed in the periphery of the disk 125, so as to prevent the same turning, yet permitting of its slight vertical movement. While I have shown two of the uprights 128, each provided with a screw 129, yet it is apparent that a screw may be omitted from one of said uprights and that the remaining screw will prevent the disk 125, turning, yet allow of its vertical movement, yet by employing two of the screws, they, together with the uprights, will form a better guide for the movement of the said disk.

The valve stem 53, is provided near the valve 52, thereon with a horizontally disposed plate or collar 131, to cause the hydrocarbon to be spread or sprayed as it strikes the same when discharged through the opening 51, or valve seat for the needle valve. The stem 53, is also provided with a projection 132, against which the lower end of spring 133, coiled around the stem and hub 121, of the disk 120, rests, the other end of which spring rests against the inner surface of the upper portion of the extension 112, to press the stem 53, downwardly so as to hold the cam-faced extension 124, in yielding contact with the similarly shaped extension 123, of the regulator for the hydrocarbon. That end of the supply pipe 85, within the reservoir 86, is provided with a valve casing 134, in which is located a ball valve 135, to close the valve seat 136, in said casing against back pressure in the supply pipe, the upper portion of which within the receptacle 86, is provided with a priming basin 137, into which hydrocarbon may be poured when desired, access to said basin being had by removing a screw plug 138, located in a suitable opening in the upper portion of the reservoir.

From the above description it will be understood that the improved carbureter constructed according to the invention is susceptible of considerable modification without material departure from the principles and spirit of the invention, and for this reason I do not desire to be understood as limiting myself to the precise form and arrangement of the several parts herein set forth, in carrying out my invention in practice.

The operation is as follows:—Gasolene or other liquid hydrocarbon is supplied to the pump from the cavity 88, of the member 84, which, as before stated, has communication through a pipe 85, with the reservoir 86, for hydrocarbon. Through the suction or operation of the engine, the valve 23, of the mixing chamber will be raised until the openings 110, therein, are placed in communication with the air chamber 25, at which time air will pass through said openings and be discharged inwardly and upwardly into the mixing chamber above the upper end of the pump body. In the upward movement of the valve 23, the pump plunger 65, being connected thereto by means of the sleeve 28, and arms 60, will be caused to rise in its cavity and thus force gasolene therefrom through the channel or port 59, in the valve seat 49, in which operation the ball valve 50, will be slightly raised thus allowing the liquid to pass through the apertures 56, and 57, of the tubular guard 54, and from thence out through the port or valve seat 51, into the mixing chamber, the quantity of liquid being regulated by means of the needle valve 52, on the valve stem 53, which may be suitably adjusted at its upper end within the extension 124, by turning the wheel 126, in the proper direction, which wheel will be held in fixed position by means of the spring pawl 127, which engages the same. As soon as the suction in the mixing chamber ceases or is overcome, the spring 66, will force the valve 23, sleeve 28, and pump plunger downwardly, in which operation liquid will be drawn through the opening in the valve seat 73, openings 72, in the plug 69, opening 75, in the guard 54, channels or ports 70, and 71, into the cavity of the pump body, after which the above-named operation will be repeated. In the action of the pump, the tubular guard 54, in the upper portion of the pump body, as well as the similar guard in the opening 72, will be pressed upwardly by means of their respective ball valves and the pressure applied thereto, but as soon as pressure is removed the springs 58, in said guards will press the same against the ball valves thus causing them to be accurately seated, in which positions they will be held against accidental displacement owing to the vibrations of the machine. When the ball valve 74, in the intake port is raised by the suction caused by the downward stroke of the plunger, it is evident that the opening 75, in the tubular guard 54, for said valve, which opening is somewhat larger than the port 70, will allow the liquid to pass from said tubular guard in any position that the latter may occupy. To prevent the pump from discharging excessive quantities of gasolene into the mixing chamber, the by-pass channels or ports 80, and 81, are employed for it is apparent that the surplus liquid will be forced downwardly through said ports into the chamber 76, from whence it will pass through the port 82, into the inlet port from which it will be again drawn into the pump.

In the initial action of the pump when the float valve 79, in the chamber 76, is maintained by the accumulation of liquid in said chamber at a point too low to close the port 80, it is evident that some of the liquid will be drawn upwardly through the ports 80, and 81, and discharged into the mixing chamber, but as soon as the valve 79, closes the port 80, the excess of the surplus hydrocarbon will pass through the channel 82, into the supply port, as before stated. Should any surplus hydrocarbon be discharged into the mixing chamber and should the same collect on the upper surface of the valve 23, it is apparent that the groove 107, will conduct the liquid to the channels 106, in the plunger 96, from which channels it will pass through the bore 97, into the channel or chamber 90, (see Fig. 4,) from which chamber it will be discharged through the valve-casing 93, and pipe 92. By this arrangement it is manifest that the surplus liquid held by the valve 23, will be pumped out of the same through the instrumentality of the plunger 96, and its ball-valve 99, which is seated in the lower end of said plunger.

By reference to Fig. 11, which illustrates the valves which control and regulate the admission of air to the air chamber, it will be seen and understood that the valve 38, is smaller than the valve 39, and that the spring 41, which actuates the first-named valve is also smaller or of less tension than the spring 42, which actuates the valve 39, and this arrangement is employed so that when the engine is running at low speed, and requires a small amount of air, the valve 38, will be automatically operated by the action of the engine, but when the speed of the latter is increased, and a greater quantity of air is required, the valve 39, will be automatically actuated as well as the first-named valve, thus supplying the necessary quantity of air to the air chamber from which it will pass into the mixing chamber and be charged with hydrocarbon from which chamber it will pass through the extension 112, into the engine. In order to regulate the quantity of hydrocarbon admitted to the mixing chamber the lever 116, through its connection with a lever (not shown) on the machine, may be moved so as to turn the cam-faced extension 123, from the position shown in Fig. 2, which operation will cause the cam-faced extension 124, valve stem 53, and valve 52, to be raised, thus opening the valve seat or discharge port 51, to the desired extent. The movement of the extensions 123, and 124, can be regulated by changing the pivot 118, of the link 119, from one of the openings 117, to another in the lever 116, which lever is fixed on the shaft 114, so as to turn the damper 115, mounted thereon at the required time to control the admission of the mixture to the engine.

Having thus fully described my invention what I claim as new and desire to secure by Letters-Patent is—

1. A carbureter having in combination a carbureting chamber, means to admit air thereto, a pump extended into the casing and having a valve-controlled intake port communicating with a supply of hydrocarbon and a valve-discharge port communicating with the carbureting chamber, and also having a valve-controlled by-pass communicating at one of its ends with the upper portion of the discharge port and at its other end with the intake port, a suction control valve for the carbureting chamber connected to the pump plunger, and means to return said valve and plunger.

2. A carbureter having in combination a carbureting chamber, means to admit air thereto, a pump extended into the casing and having a valve-controlled intake port communicating with a supply of hydrocarbon and a valve controlled discharge port communicating with the carbureting chamber, and also having a valve-controlled by-pass communicating at one of its ends with the discharge port and at its other end with the intake port, and a spring actuated valve connected to the pump plunger to open and close the carbureting chamber.

3. A carbureter having in combination a carbureting chamber, a pump extended into the casing and having a valve-controlled intake port communicating with a supply of hydrocarbon and a valve-controlled discharge port communicating with the carbureting chamber, said pump also having a valve-controlled by-pass communicating at one of its ends with the discharge port near its discharging end and at its other end with an inlet, a suction control valve for the carbureting chamber connected to the pump plunger, means to return said valve and plunger, and means to regulate the admission of both air and hydrocarbon to the carbureting chamber.

4. A carbureter having in combination a carbureting chamber, a pump extended into the casing and having a valve-controlled intake port communicating with a supply of hydrocarbon and a valve-controlled discharge port communicating with the carbureting chamber, said pump also having a valve-controlled by-pass communicating at one of its ends with the discharge port near its discharging end and at its other end with an inlet, a suction control valve for the carbureting chamber connected to the pump plunger, means to return said valve and plunger, means to automatically regulate the admission of air to the carbureting chamber, and means to simultaneously regulate the admission of hydrocarbon to the said chamber and the mixture of air and hydrocarbon to the engine.

5. A carbureter having in combination a carbureting chamber, a pump extended into the casing and having a valve-controlled intake port communicating with a supply of hydrocarbon and a valve-controlled discharge port communicating with the carbureting chamber, said pump also having a valve-controlled by-pass communicating at one of its ends with the discharge channel near its discharging end and at its other end with an inlet, a suction control valve for the carbureting chamber connected to the pump plunger, means to return said valve and plunger, means to automatically regulate the admission of air to the carbureting chamber under variable speed of the engine, and means to regulate the admission of hydrocarbon to the carbureting chamber and the mixture of air and hydrocarbon to the engine.

6. A carbureter having in combination a carbureting chamber, means to admit air thereto, a pump extended into the casing and having a valve-controlled intake port communicating with a supply of hydrocarbon and a valve-controlled discharge port communicating with the carbureting chamber, a suction control valve for said chamber, connected to the pump plunger, said valve having a valve-controlled discharge orifice communicating at one of its ends with the carbureting chamber and at its other end with an oulet therefor, and means to return the valve of the carbureting chamber and plunger.

7. A carbureter having in combination a carbureting chamber, means to admit air thereto, a pump extended into the casing and having a valve-controlled intake port communicating with a supply of hydrocarbon and a valve-controlled discharge port communicating with the carbureting chamber, said pump also having a valve-controlled by-pass communicating at one of its ends with the discharge port near its discharging end, a suction control valve for the carbureting chamber connected to the pump plunger, said valve having a valve-controlled orifice communicating at one of its ends with the carbureting chamber and at its other end with an outlet therefor, and means to return the valve of the carbureting chamber and said plunger.

8. A carbureter having in combination a carbureting chamber, a pump extended into the casing and having a valve-controlled intake port communicating with a supply of hydrocarbon and a valve-controlled discharge port communicating with the carbureting chamber, said pump also having a valve-controlled by-pass communicating at one of its ends with the discharge port near its discharging end, a suction control valve for the carbureting chamber connected to the pump plunger, said valve having a valve-controlled orifice communicating at one of its ends with the carbureting chamber and at its other end with an outlet therefor, means to return the valve of the carbureting chamber and said plunger, and means to regulate the admission of both air and hydrocarbon to the cabureting chamber.

9. A carbureter having in combination a carbureting chamber, means to admit air thereto, a pump extended into the casing and having a valve-controlled intake port communicating with a supply of hydrocarbon and a valve-controlled discharge port communicating with the carbureting chamber, a suction control valve for said chamber connected to the pump plunger, a suitably incased plunger having a valve-controlled discharge channel extended therethrough, said plunger connected at one of its ends to said valve, one end of said channel communicating with the carbureting chamber and its other end with a suitable outlet therefor, and means to return the valve of the carbureting chamber and said plunger.

10. A carbureter having in combination a carbureting chamber and an inward extension provided with a pump body and a vertical opening extended from the upper portion of said inward extension, a plunger in the pump body, a suction control valve for the carbureting chamber connected to the pump plunger, said pump having a valve-controlled intake port and a valve-controlled discharge port communicating with the carbureting chamber, another plunger located in the opening of said extension and having a valve-controlled channel extended therethrough, said plunger connected at its upper portion to the valve of the carbureting chamber, said channel communicating at one of its ends with the carbureting chamber and at its other end with a suitable conduit, and means to return the valve of the carbureting chamber and the pump plunger.

11. A carbureter having in combination a carbureting chamber, means to admit air thereto, a pump extended into the casing and having a valve-controlled intake port communicating with a supply of hydrocarbon and a valve-controlled discharge port communicating with the carbureting chamber, a suction control valve for the carbureting chamber connected to the pump plunger, means to return said valve and plunger, a spring pressed needle valve mounted to open and close the discharge port of the pump, a cam-faced extension adjustably mounted on the upper portion of the stem of the needle valve, another cam-faced extension rotatably mounted on said stem to contact with the first named extension, and means to turn the said rotatably mounted extension.

12. A carbureter having in combination a carbureting chamber, means to admit air thereto, a pump extended into the casing and carbureting chamber and having a valve seat in its end within said chamber, a suction control valve for the carbureting chamber connected to the pump plunger, means to return said valve and plunger, a needle valve mounted to open and close the valve seat in the pump, a cam-faced extension adjustably mounted on the upper portion of the stem of said needle valve, another cam-faced extension rotatably mounted on said stem to co-act with the first named extension, a conduit communicating with the carbureting chamber, a damper shaft journaled in the conduit, a damper on said shaft within the conduit, a lever fixed to said shaft, and a connection pivotally united at one of its ends to said lever and at its other end to the said rotatably mounted extension.

13. A carbureter having in combination a carbureting chamber, means to admit air thereto, a pump extended into the casing and having a valve-controlled intake port communicating with a supply of hydrocarbon and a discharge port communicating with the carbureting chamber, a ball valve seated in said discharge port, a spring pressed tubular guard having an opening in its lower portion and resting on said valve, a suction control valve for the carbureting chamber connected to the pump plunger, and means to return said valve and plunger.

14. A carbureter having in combination a carbureting chamber, means to admit air thereto, a pump extended into the casing and having a valve-controlled intake port communicating with a supply of hydrocarbon and a discharge port communicating with the carbureting chamber, a ball-valve located in said discharge port, and a spring pressed tubular guard having an opening in its lower portion and located in said port and resting against said valve.

15. A carbureter having in combination a carbureting chamber, means to admit air thereto, a pump extended into the casing and having a discharge port communicating with the carbureting chamber, a ball-valve located in said port, and a spring pressed tubular guard having an opening in its lower portion and located in said port and resting against the ball valve therein.

16. A carbureter having in combination a carbureting chamber, means to admit air thereto, a pump extended into the casing and having an intake port and a discharge port, the latter communicating with the carbureting chamber and the former with a supply of hydrocarbon, a ball valve in each of said ports, and a spring pressed tubular guard having an opening in its lower portion and located in each of said ports and resting against each of said ball valves.

17. A carbureter having in combination a carbureting chamber, means to admit air thereto, a pump extended into the casing and having an intake port and a discharge port, the latter communicating with the carbureting chamber and the former with a supply of hydrocarbon, a ball-valve seated in the intake port, and a spring pressed tubular guard having an opening in its lower portion and located in said port and resting against said valve.

18. A carbureter having in combination a carbureting chamber, a pump extended into the casing having a valve-controlled intake port communicating with a supply of hydrocarbon and a valve-controlled discharge port communicating with the carbureting chamber, a suction control valve for the carbureting chamber connected to the pump plunger, said valve having a series of openings near its periphery and provided on its upper surface with an annular groove, and a discharge orifice communicating at one of its ends with said groove and at its other end with a suitable channel, and means to return the valve of the carbureting chamber and plunger.

19. A carbureter having in combination a carbureting chamber, a pump extended into said casing and having an intake port and a discharge port communicating with the carbureting chamber, a suction control valve for the carbureting chamber connected to the pump plunger and having a drain depression in its upper surface communicating with an outlet opening in said valve, and means to return said valve and plunger.

BARRY IVOR.

Witnesses:
 CHAS. C. TILLMAN,
 J. E. HANSEN.